United States Patent Office 3,038,149
Patented June 5, 1962

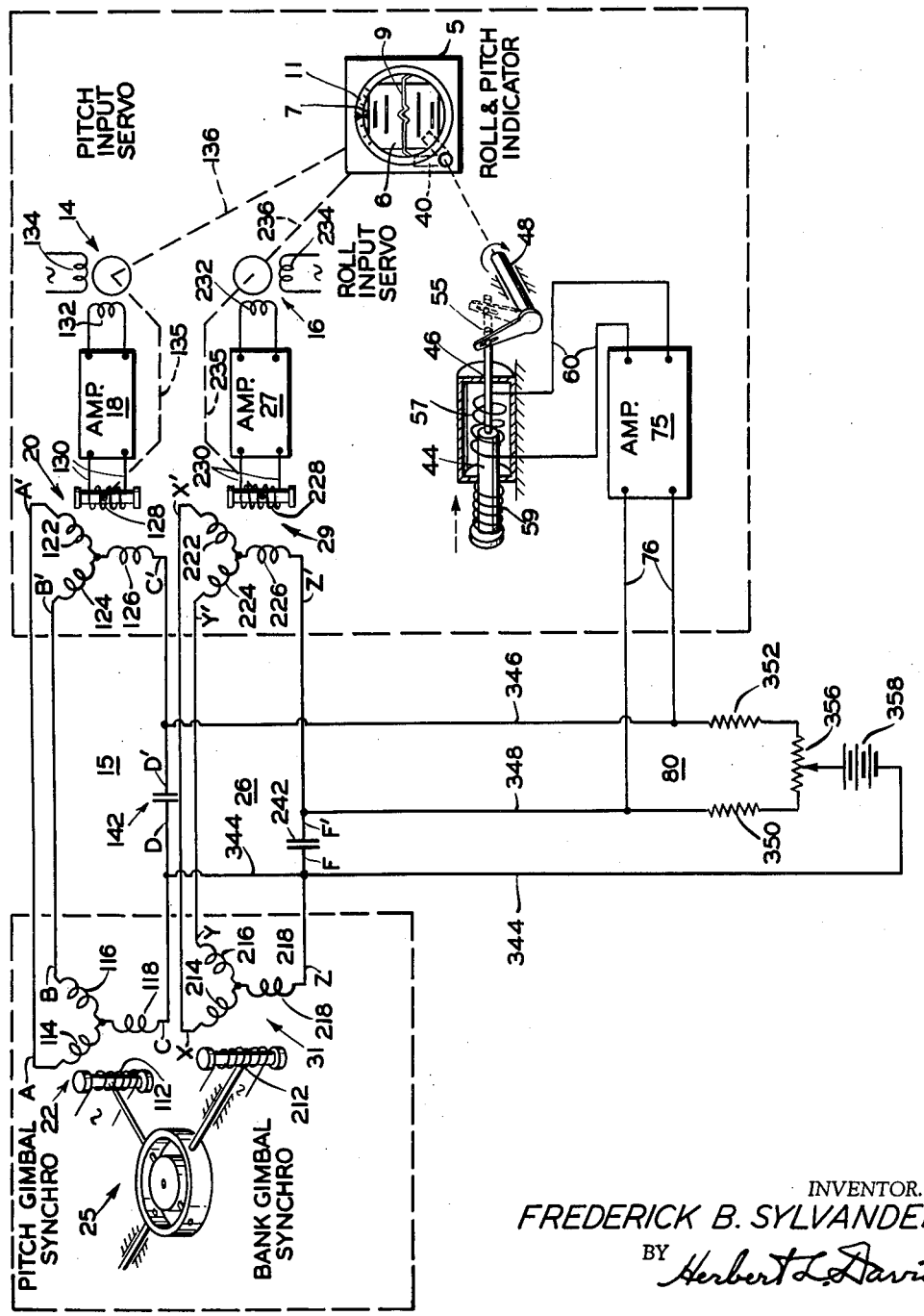

3,038,149
MONITOR CIRCUIT AND ARRANGEMENT FOR DUAL DATA TRANSMISSION SYSTEMS
Frederick B. Sylvander, Hackensack, N.J., assignor to The Bendix Corporation, a corporation of Delaware
Filed Mar. 2, 1959, Ser. No. 796,421
8 Claims. (Cl. 340—198)

The invention relates to an improved monitor circuit for dual data transmission systems and more particularly to a monitoring warning device for use with certain types of A.C. data transmitting systems to supply a warning in case of an open circuit or short circuit in certain of the parts and interconnecting wires thereof, together with a novel arrangement for compensating the monitor circuit for changes in the effective temperature of component parts of the systems.

The invention is particularly adapted for use with an A.C. data transmission system of the type disclosed and claimed in copending U.S. application Serial No. 796,133, filed February 27, 1959, by Paul F. Bechberger and assigned to Bendix Aviation Corporation. Such system may include back-to-back connected synchros and may broadly be applied to a variable induction type transformer system including A.C. transmitter and receiver devices or control transformers, wherein the transmitter and receiver devices are of a conventional type in which three output terminals of each transmitter are connected to three input terminals of a remotely located receiver, and provided furthermore that the function of the system will not be substantially deteriorated by the application of a small D.C. current to the windings of these A.C. devices. In the present invention two similar or normally identical back-to-back data systems are utilized, i.e., the pitch and roll servo systems of a remote horizon indicator, together with a novel arrangement of the two systems in relation to a fault sensing D.C. bridge so as to compensate the bridge for changes in the resistance of windings in the system due to changes in the effective temperature thereof.

A basic danger in the use of such three wire data transmission systems is that a short circuit or breakage of one of three interconnecting wires will in effect result in the transmission of incorrect data. However, in such case while electrical power or error signals may then still be transmitted to the receiver, it is difficult to notice any difference in the operation of the system under such faulty conditions from that under normal operating conditions.

An object of the invention is to provide in cooperation with dual data transmission systems novel means for providing a warning signal in the event of such a fault in either system.

Another object of the invention is to so arrange the component parts of the two systems in relation one to the other that each tends to compensate for changes in the resistance of the corresponding component part of the other due to the effective temperature.

Another object of the invention is to provide a novel fault warning system in which there is provided in one of the three interconnecting leads between the transmitting and receiving devices of each of the data transmitting systems a capacitor of sufficiently low impedance to have negligible effect upon the accuracy of the data system while opposite sides of such capacitor are connected into a D.C. bridge circuit in such a manner that each system forms an opposite arm of the bridge circuit controlling in turn output lines leading to some type of warning device, such as a warning flag, light, bell or other suitable warning means, and in which arrangement changes in the resistance of components of one system due to changes in temperature are simultaneously compensated by corresponding changes in the resistance of like components of the other system.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a schematic wiring diagram of a data transmission system including a monitor system in which the present invention is designed for use and shown as applied, for example, to a remote attitude indicating system.

The dual data transmission systems are particularly adapted for use with a remote attitude indicator of a type having a housing 5 and a calibrated face of a movable tape 6 mounted in a frame plate 7 operable by suitable mechanism in the housing 5. Such operating mechanism, not shown, is effective to rotate the tape 6 within the frame plate 7 up or down relative to an horizon bar 9 to indicate the pitch of the craft and to rotate the frame plate 7 clockwise or counterclockwise relative to suitable indicating means 11 on the face of the housing to indicate the roll attitude of the craft. Thus, the attitude of the aircraft embodying the instrument is realistically presented to the pilot.

The mechanism to effect the aforenoted operation of the tape 6 and frame plate 7 may be of a conventional type or the pitch and roll indicator mechanism may be of a type such as disclosed and claimed in copending application Serial No. 536,915, filed September 27, 1955, by Charles E. Hurlburt and assigned to Bendix Aviation Corporation.

As is well known in the art, the operating mechanism for the remote pitch and roll indicator may include separate synchro drive motors 14 and 16, shown schematically in the drawing, and in which the motor 14 serves as a pitch input servo and motor 16 serves as a roll input servo.

The pitch input motor 14, is controlled through a data transmission system 15, including an amplifier 18 of conventional type, a receiver synchro 20, and a transmitter synchro 22 responsive to the pitch attitude of an aircraft as sensed by a remotely located vertical gyro 25 of conventional type. The synchro 22 has a rotor element associated with the pitch axis of the gyro 25 and is arranged in conventional manner to provide a signal through the amplifier 18 to the control winding of the servo motor 14 which, in turn, gives an appropriate adjustment to the rotor of the receiver synchro 20 and the tape 6 of the indicator mechanism so as to indicate the pitch attitude of the aircraft.

The roll input servomotor 16 is operatively controlled through a similar data transmission system 26 including an amplifier 27 of conventional type, a receiver synchro 29 and transmitter synchro 31 forming a separate system from that of the system 15. The rotor of synchro 31 is associated with the bank or roll axis of the remotely located vertical gyro 25 so as to provide a signal through the amplifier 27 to the control winding of the roll input servomotor 16 which, in turn, gives an appropriate adjustment to the rotor of the receiver synchro 29 and the frame plate 7 of the indicator mechanism so as to indicate the roll attitude. Thus, the servomotors 14 and 16 appropriately adjust the tape 6 and the frame plate 7 so as to indicate the pitch and roll attitude of the aircraft as sensed by the remotely located vertical gyro 25.

Upon an opening or fault in the operating lines interconnecting the transmitter device 22 with the receiver device 20 and the transmitter device 31 with the receiver device 29, such faulty condition of operation is immediately brought to the attention of the operator of the craft, through the mechanism hereinafter described by operation of a signal device 40.

The visual indication of such faulty operating condition is the small metal flag 40 operated by the herein provided control mechanism so as to be visible on the face of the remote attitude indicator when any of the aforenoted operating lines are being interrupted for any reason. When the unit is operating properly and there is no interruption in the operating lines aforenoted, the flag 40 is normally retracted by operation of the control mechanism to a position, indicated in the drawing by dotted lines, behind a portion of the surrounding rim of the dial so as to be visually ineffective.

The positioning of the flag 40 is effected through an armature 44 and actuating rod 46 operably connected to a shaft 48, as shown schematically in the drawing. The shaft 48 is rotatably mounted in bearings in the housing 5 and operated through a linkage 55 upon energization of an electromagnetic winding 57 cooperating with the armature 44 so as to effect movement of the flag 40 from the retracted dotted line position behind the edge of dial, as shown in the drawing, to an effective visual position also indicated in the drawing by dotted lines. Upon deenergization of the winding 57, a spring 59, shown schematically, is effective to return the flag 40 to the retracted position.

Excitation of the winding 57 of the electromagnetic actuator is provided through lines 60 leading from the output of an amplifier 75 having input lines 76 connected in turn across the output of a Wheatstone control bridge 80 which senses an interruption or fault in the operating lines of the data transmission systems 15 and 26, as hereinafter explained.

More specifically in the data transmission system 15, transmitter synchro or rotary induction transformer 22 has a rotor winding 112 connected across a suitable source of alternating current and inductively coupled to stator windings 114, 116 and 118. Further, the receiver synchro or rotary induction transformer 20 has stator windings 122, 124 and 126 and a rotor winding 128 inductively coupled to the stator windings 122, 124 and 126. Conductors 130 lead from the winding 128 so as to apply an output signal through amplifier 18 to a control winding 132 of a two-phase servomotor 14 of conventional type having a fixed phase winding 134. The motor 14 is operatively connected through a follow-up shaft 135 to the rotor of the synchro 20. The position of the rotor winding 128 is adjusted thereby so as to follow the adjusted position of the winding 112 of the transmitter synchro 22 in a conventional manner, while a corresponding movement is imparted to an output shaft 136 to adjust the tape 6 to indicate the pitch of the aircraft, as heretofore described.

As shown, the stator winding 114 is connected by conductors AA' to the stator winding 122 of the receiver synchro 20, while the stator winding 116 of the transmitter synchro 22 is connected by conductors BB' to the stator winding 124 of the receiver synchro 20. The stator winding 118 of the transmitter synchro 22 is connected by a conductor CD to one plate of a capacitor 142, while the opposite plate of the capacitor 142 is connected by conductor D'C' to the stator winding 126 of the receiver synchro 20.

Similarly in the data transmission system 26 the rotor element of the transmitter synchro or rotary induction transformer 31 has a rotor winding 212 connected across a suitable source of alternting current and inductively coupled to stator windings 214, 216 and 218. Further, the receiver synchro or rotary induction transformer 29 has stator windings 222, 224 and 226 and a rotor winding 228 inductively coupled to the stator windings 222, 224 and 226. Conductors 230 lead from the winding 228 so as to apply an output signal through amplifier 27 to a control winding 232 of a two-phase servomotor 16 of conventional type having a fixed phase winding 234. The motor 16 is operatively connected through a follow-up shaft 235 to the rotor of the synchro 29. The position of the rotor winding 228 is adjusted thereby so as to follow the adjusted position of the winding 212 of the transmitter synchro 31 in a conventional manner, while a corresponding movement is imparted to an output shaft 236 to adjust the frame plate 7 to indicate the roll attitude of the aircraft as heretofore described.

As shown, the stator winding 214 is connected by conductors XX' to the stator winding 222 of the receiver synchro 29, while the stator winding 216 of the transmitter synchro 31 is connected by conductors YY' to the stator winding 224 of the receiver synchro 29. The stator winding 218 of the transmitter synchro 31 is connected by a conductor ZF to one plate of a capacitor 242 while the opposite plate of the capacitor 242 is connected by conductor F'Z' to the stator winding 226 of the receiver synchro 29.

From the foregoing, it will be seen that the conductors CD and D'C' lead from opposite plates of the capacitor 142 and are connected to stator windings 118 and 126 of the synchros 22 and 20, respectively, while conductors 344 and 346 lead from the conductors CD and D'C' and serve to connect the stator windings of the synchros 20 and 22 into the D.C. bridge circuit 80 so as to provide a controlling arm therefor. Similarly, the conductors ZF and F'Z' lead from opposite sides of the capacitor 242 and are connected to stator windings 218 and 226 of the synchros 31 and 29, respectively, while conductors 344 and 348 lead from the conductors ZF and F'Z' and serve to connect the stator windings of the synchros 29 and 31 into the D.C. bridge circuit 80 so as to provide an opposite controlling arm. The D.C. bridge circuit 80 includes as other arms of the bridge circuit, resistors 350 and 352, together with a variable calibrating resistor 356 and a D.C. voltage source 358 connected across input lines of the bridge circuit 80 and between the variable calibrating resistor 356 and the common input line 344.

The output of the bridge circuit 80 is connected through conductors 76 to the input of the amplifier 75 having the output lines 60 leading to the winding 57 which controls the operation of the warning flag 40 or other suitable warning device, as heretofore described.

The warning flag 40 may be of a type described in Konet et al. U.S. Patent No. 2,664,558, granted December 29, 1953, and assigned to Bendix Aviation Corporation. During normal operation of the system the flag 40 may be biased by the spring 59 in a counterclockwise direction to a position at which the flag 40 is hidden from the view of the operator. However, upon a faulty operation of the data transmission system, as hereinafter described, the output signal from the bridge 80 applied across the lines 75 is sufficient to cause amplifier 75 to effect energization of the winding 57 so as to actuate the flag 40 in a clockwise direction to a position in which the flag 40 is visible to the operator so as to indicate a faulty condition.

In the aforenoted arrangement, it will be seen that the bridge 80 may be readily adjusted by the calibrating resistor 356 to a balanced relation relative to the resistance of the stator windings of the synchros forming the opposite controlling arms of the bridge 80.

Each of the data transmission systems 15 and 26 has a capacitor 142 and 242, respectively, inserted in one of its three interconnecting lines and the arrangement is such that the Wheatstone bridge circuit 80 is formed with the impedance of the stator windings and interconnecting leads of the synchros of system 15 as one control arm of the bridge, while an opposite control arm of the bridge is formed with the impedance of the stator windings and interconnecting leads of the synchros of system 26. The bridge circuit 80 includes the other two resistors 350 and 352 and a D.C. voltage source 358. Upon a discontinuity in the impedance of either system 15 or 26, the bridge 80 becomes electrically unbalanced effecting an output from the bridge 80 which is fed through lines 76 to a suitable fault warning indicator apparatus through the amplifier 75.

Thus, through the foregoing arrangement, if any one of the circuits AA', BB', XX', DC, C'D', ZF, Z'F', YY', is opened, an unbalanced condition of the bridge 80 will occur and likewise if both AA' and BB' or both XX' and YY' are opened, a similar bridge unbalance will occur resulting in an output voltage across the lines 76 effective to operate the control winding 57 of the warning device 40 through the amplifier 75.

From the foregoing, it will be seen that there has been provided novel means for detecting a fault in the operating lines of the dual data transmission systems through the insertion of capacitors 142 and 242 into one of the interconnecting lines of each of the dual data transmission systems 15 and 26 so as to make possible through the Wheatstone bridge 80 a resistance measurement of the respective synchro windings in the operating circuits thereof. Thus, such resistance measurement provides through the bridge circuit 80 an indication of discontinuity in either data transmission system due to fault in one or the other of interconnecting lines or stator windings of the synchros in the respective systems, and further, there is provided in the arrangement of the two systems in the bridge circuit 80, as opposite controlling arms thereof, a novel means for compensating for changes in the resistance of the operating windings of the respective synchros due to temperature change therein and which changes might otherwise cause the bridge 80 to become unbalanced so as to effect an erroneous warning signal.

Thus, as shown in the drawing, the stator windings for the synchros 22 and 31 are positioned in close proximity one to the other so that the effective temperature thereof is substantially the same. Similarly, the stator windings of the synchros 20 and 29 are positioned in close proximity one to the other so that the effective temperature of the synchros 20 and 29 is substantially the same, although since the synchros 20 and 29 are remotely located from the synchros 22 and 31 the one group of synchros may well be subject to an entirely different temperature than the other.

Moreover, since the components of the data transmission system 15 are of similar construction to corresponding components of the data transmission system 26 and similar components in each system are in proximity one to the other so as to take on the same temperature effects, a change in the resistance of one component in one of the data transmission systems due to temperature is counterbalanced by a similar change in the resistance of a like component in the other data transmission system. Thus, the balance of the bridge 80 is uneffected by changes in the resistance of the several components of the two systems due to change in temperature, since such corresponding parts of the two systems are in opposite control arms of the bridge 80. Thus, a change in the resistance of a synchro in one arm of the bridge 80 is effectively counterbalanced by an effective change in the resistance of the corresponding synchro in the companion data transmission system so as to eliminate the effects on the bridge circuit 80 of such temperature changes in the resistances of the corresponding parts of the systems 15 and 26.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a control network of a type including dual data transmission systems, each dual data transmission system including an alternating current signal transmitting device and an alternating current signal receiving device remote from the signal transmitting device, each device including inductive windings, and several electrical conductors to operatively connect said inductive windings of the transmitting device to said inductive windings of the receiving device for transmitting said signals from the transmitting device to the receiving device; the improvement comprising a capacitor connected in one of said electrical conductors of each system, a normally balanced electrical network having an electrical input and an electrical output, a direct current source of electrical energy operably connected to said input, other electrical conductors leading from opposite sides of the capacitor in each of the systems so as to electrically connect a part of each data transmission system into the normally balanced electrical network in opposite controlling relation, said part including in each system said inductive windings of each of said devices and said several electrical conductors therefor, said parts of said data transmission systems cooperating so as to normally electrically balance said network, and fault warning means connected to the electrical output of said normally balanced electrical network to be rendered operative upon the electrical output becoming effective by an unbalancing of the network due to a discontinuity arising in said part of one of the data transmission systems electrically connected in opposite controlling relation in said normally balanced electrical network.

2. The combination defined in claim 1 in which the signal transmitting device of one of the data transmitting systems is located in the proximity of the signal transmitting device of the other of the data transmitting systems so as to be subject to substantially the same changes in temperature, and the data receiving device of one of the data transmitting systems is located in the proximity of the signal receiving device of the other of the data transmitting systems so as to be subject to substantially the same changes in temperature, said devices of the one system being of similar construction to the corresponding devices of the other system, the inductive windings of the devices of the one system being electrically connected in the normally balanced electrical network in one control relation, and the inductive windings of the devices of the other system being electrically connected in the normally balanced network in an opposite controlling relation so that a temperature change in the resistance of the inductive windings of the devices of the one system are effectively counterbalanced by a corresponding temperature change in the resistance of the inductive windings of the devices of the other system so that the electrical balance of the network is substantially uneffected by the temperature changes in the resistances of said windings.

3. In a control network of a type including dual data transmission systems, each dual data transmission system including an alternating current signal transmitting device and an alternating current signal receiving device remote from the signal transmitting device, each device including a variable induction transformer having several windings electrically connected together and variably inductively coupled to another winding, and several electrical conductors to operatively connect said several inductive windings of the transmitting device to said several inductive windings of the receiving device for transmitting said signals from the transmitting device to the receiving device; the improvement comprising a capacitor connected in one of said electrical conductors of each system, a normally electrically balanced Wheatstone bridge having an electrical input and an electrical output, a direct current source of electrical energy operably connected to said input, other electrical conductors leading from opposite sides of the capacitor in each of the systems so as to electrically connect a part of one of the data transmission systems into one arm of the normally electrically balanced Wheatstone bridge and a part of the other of said data transmission systems into an opposite arm of the bridge, each of said parts including said several inductive windings of each of said devices and said several electrical conductors for transmitting said signals from the transmitting device to the receiving device, said parts of said data transmission systems cooperating so as to normally electrically balance said bridge, and fault warning means connected to the electrical output of said normally electrically balanced Wheatstone bridge, said fault warning means being rendered operative upon an unbalancing of the bridge due to a fault in one or the other of the parts of the data transmission systems electrically connected in said normally balanced bridge.

4. The combination defined by claim 3 in which the signal transmitting device of one of the data transmitting systems is so located relative to the signal transmitting device of the other of the data transmitting systems as to be subject to substantially the same changes in temperature, and the data receiving device of one of the data transmitting systems is so located relative to the data receiving device of the other of the data transmitting systems as to be subject to substantially the same changes in temperature, said devices of the one system being similar to the corresponding devices of the other system so that a temperature change in the resistance of the inductive windings of the devices of the one system are effectively counterbalanced by a corresponding temperature change in the resistance of the inductive windings of the devices of the other system so that the electrical balance of the normally balanced Wheatstone bridge is substantially uneffected by the temperature changes in the resistances of said windings.

5. In an electrical network of a type including a pair of signal transmitting systems, each of said systems including a signal transmitting variable coupling transformer, a signal receiving variable coupling transformer remotely located from the signal transmitting transformer, and three electrical conductors to operatively connect the signal transmitting transformer to the signal receiving transformer; the improvement comprising a capacitor connected in one of said electrical conductors of each system, a normally balanced Wheatstone bridge having an electrical input and an electrical output, a direct current source of electrical energy operably connected to said input, other electrical conductors leading from opposite sides of the capacitor in each of the systems so as to electrically connect a part of each system including the first-mentioned three electrical conductors into opposite control arms of the normally balanced bridge, said parts of said signal transmitting systems cooperating so as to normally electrically balance said bridge, and control means operatively connected to the electrical output of said normally balanced electrical bridge, said control means being rendered operative upon a change in the continuity of either part of the systems electrically connected in said opposite control arms and effective to electrically unbalance said bridge.

6. In an electrical network of a type including a pair of signal transmitting systems, each of said systems including a signal transmitting variable coupling transformer, a signal receiving variable coupling transformer remotely located from the signal transmitting transformer, and three electrical conductors to operatively connect the signal transmitting transformer to the signal receiving transformer; the improvement comprising a capacitor connected in one of said electrical conductors of each system, a normally balanced Wheatstone bridge having an electrical input and an electrical output, a direct current source of electrical energy operably connected to said input, other electrical conductors leading from opposite sides of the capacitor in each of the systems so as to electrically connect a part of each system including the first-mentioned three electrical conductors into opposite control arms of the normally balanced bridge, said parts of said signal transmitting systems cooperating so as to normally electrically balance said bridge, the signal transmitting transformers being similar one to the other and being located in the proximity one of the other so as to be effected equally by changes in temperature, and the remotely located signal receiving transformers being similar one to the other and being located in the proximity one of the other so that the receiving transformers are equally effected by changes in temperature, the opposite control arms of the normally balanced bridge being thereby equally effected by temperature changes in the resistance of the transmitting and receiving transformers so that the electrical balance of the bridge is substantially uneffected by the temperature changes in the resistances thereof, and control means operatively connected to the electrical output of said normally balanced electrical bridge, said control means being rendered operative upon a change in the continuity of either part of the systems electrically connected in said opposite control arms and effective to electrically unbalance said bridge.

7. In an electrical network of a type including a pair of independently operable data transmission systems, each system including electrical conductors for transmitting alternating current signals from a transmitting device to a receiving device; the improvement comprising a fault warning system including means to apply through a part of each data transmission system an electric current having an electrical characteristic substantially different from said electric signals, capacitor means to couple the signals from the transmitting device to the receiving device and to so electrically isolate said data transmission systems and said warning system that the electrical current of said warning system has negligible effect on the electric signals transmitted by each of said data transmission systems, and the warning system including indicator means actuated when a fault in said part of one of said data transmission systems causes a substantial change in the electrical resistance of said part of said one data transmission system.

8. In an electrical network of a type including a pair of independently operable data transmission systems, each system including means for transmitting electric signals having a predetermined electrical characteristic to a receiving device; the improvement comprising a warning system operating on an electric current having an electrical characteristic substantially different from that of said electric signals, said warning system including means to apply the operating electric current thereof through a part of each data transmission system, means to couple the signals from the transmitting device to the receiving device and to so electrically isolate said warning system relative to each of said data transmission systems that the operating electric current of the warning system has negligible effect on the electric signals transmitted by each of said data transmission systems, and the warning system including control means rendered effective upon a substantial change in an operative condition of said part of one of said data transmission systems.

References Cited in the file of this patent

UNITED STATES PATENTS

| | | |
|---|---|---|
| 2,578,455 | Seely | Dec. 11, 1951 |
| 2,632,882 | Jupp | Mar. 24, 1953 |
| 2,634,404 | Carmichael | Apr. 17, 1953 |
| 2,672,880 | Hermanson | Mar. 23, 1954 |
| 2,891,218 | Werts | June 16, 1959 |